United States Patent [19]
Florencio et al.

[11] Patent Number: 6,125,147
[45] Date of Patent: Sep. 26, 2000

[54] METHOD AND APPARATUS FOR REDUCING BREATHING ARTIFACTS IN COMPRESSED VIDEO

[75] Inventors: Dinei Afonso Ferreira Florencio, Plainsboro; Shipeng Li, Princeton, both of N.J.

[73] Assignee: Motorola, Inc., Schaumburg, Ill.

[21] Appl. No.: 09/127,451

[22] Filed: Jul. 31, 1998

Related U.S. Application Data

[60] Provisional application No. 60/084,632, May 7, 1998.

[51] Int. Cl.$^7$ ............................................. H04N 7/36
[52] U.S. Cl. ................. 375/240.29; 348/845; 348/845.1; 375/240.26
[58] Field of Search ................... 375/240.26, 240.29; 348/413, 416, 845, 845.1; H04N 7/36

[56] References Cited

U.S. PATENT DOCUMENTS

| | | | |
|---|---|---|---|
| 4,851,906 | 7/1989 | Koga et al. | 348/413 |
| 5,229,864 | 7/1993 | Moronaga et al. | 358/433 |
| 5,231,484 | 7/1993 | Gonzales et al. | 348/405 |
| 5,361,105 | 11/1994 | Iu | 348/416 X |
| 5,479,211 | 12/1995 | Fukuda | 348/405 |
| 5,734,755 | 3/1998 | Ramchandran et al. | 348/403 |
| 5,844,614 | 12/1998 | Chong et al. | 348/420 |

FOREIGN PATENT DOCUMENTS 0 721 286 A 2  10/1996  European Pat. Off. ......... H04N 7/30

OTHER PUBLICATIONS

Bellifemine F et al: "Statistical Analysis of the 2D–DCT Coefficients of the Differential Signal for Images" Signal Processing. Image Communication, vol. 4, No. 6, Nov. 1, 1992, pp. 477–488, XP000322089 ISSN: 0923–5965.

PCT International Search Report PCT/US99/1024 corresponding to 09/127,451.

*Primary Examiner*—Howard Britton
*Attorney, Agent, or Firm*—William J. Burke

[57] ABSTRACT

A method and apparatus for reducing breathing artifacts in MPEG-like video information streams employing group of pictures (GOP) or group of frames (GOF) structures.

21 Claims, 8 Drawing Sheets

METHOD AND APPARATUS FOR REDUCING BREATHING ARTIFACTS IN COMPRESSED VIDEO

This application claims the benefit of U.S. Provisional Application No. 60/084,632, filed May 7, 1998.

The invention relates to communications systems generally and, more particularly, the invention relates to a method and concomitant apparatus for reducing a "breathing" artifact within an encoded information stream.

BACKGROUND OF THE DISCLOSURE

In several communications systems the data to be transmitted is compressed so that the available bandwidth is used more efficiently. For example, the Moving Pictures Experts Group (MPEG) has promulgated several standards relating to digital data delivery systems. The first, known as MPEG-1 refers to ISO/IEC standards 11172 and is incorporated herein by reference. The second, known as MPEG-2, refers to ISO/IEC standards 13818 and is incorporated herein by reference. A compressed digital video system is described in the Advanced Television Systems Committee (ATSC) digital television standard document A/53, and is incorporated herein by reference.

The above-referenced standards describe data processing and manipulation techniques that are well suited to the compression and delivery of video, audio and other information using fixed or variable length digital communications systems. In particular, the above-referenced standards, and other "MPEG-like" standards and techniques, compress, illustratively, video information using intra-frame coding techniques (such as run-length coding, Huffman coding and the like) and inter-frame coding techniques (such as forward and backward predictive coding, motion compensation and the like). Specifically, in the case of video processing systems, MPEG and MPEG-like video processing systems are characterized by prediction-based compression encoding of video frames with or without intra- and/or inter-frame motion compensation encoding.

In a typical MPEG encoder, a received video stream comprising a plurality of video frames is encoded according to a predefined group of pictures (GOP) structure. That is, the received video stream is encoded to produce a GOP comprising, e.g., an intra-coded frame (I-frame), followed by one or more forward predicted coded frames (P-frames) and bi-directional (i.e., forward and backward) predicted frames (B-frames).

Unfortunately, since motion compensation techniques are not perfect, predicted frames or pictures may suffer from undesirable visual artifacts such as error propagation, reduced editing granularity and the like. Moreover, GOP structures including such predicted frames also suffer from such artifacts. Since the fidelity of individual frames within a GOP structure tend to degrade after an initial high quality I-frame, the display of a sequence of GOPs produces a cyclical visual artifact known as "breathing," where the cyclical nature of the artifact is related to the length of the GOPs displayed.

Therefore, it is seen to be desirable to provide a method and concomitant apparatus that reduce the above-described "breathing" artifact.

SUMMARY OF THE INVENTION

The invention comprises a method and apparatus for reducing breathing artifacts in MPEG-like video information streams employing group of pictures (GOP) or group of frames (GOF) structures. Specifically, in a system for processing a sequence of compressed images arranged according to a group of pictures (GOP) information structure, a method according to the invention for reducing an inter-GOP visual artifact comprises the steps of: determining, for a first type of information frame within the GOP information structure, a respective level of fidelity degradation; determining, for a second type of information frame within the GOP information structure, a respective level of fidelity degradation; computing, using the determined levels of fidelity degradation, a degradation equalization parameter; and processing, using the computed degradation equalization parameter, one of the first and second types of information frames such that the first and second types of information frames have levels of fidelity degradation within a predetermined range.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention will be described within the context of a video decoder, illustratively an MPEG-2 video decoder, within a digital television (DTV) receiver, illustratively an ATSC television receiver. However, it will be apparent to those skilled in the art that the invention is applicable to any video processing system, including those systems adapted to DVB, MPEG-1 and other information streams.

Specifically, the invention will be primarily described within the context of an MPEG-like decoding system that receives and decodes a compressed video information stream IN to produce a video output stream OUT. The invention operates to reduce a "breathing" artifact that, in the case of a video or image processing system utilizing a group of pictures (GOP) information structure, is caused by intra-GOP changing of visual fidelity levels resulting in a modulation of visual fidelity at the GOP presentation rate.

However, it will be apparent to those skilled in the art that the invention has broad applicability to other information systems having different inter-frame fidelity levels within a group of pictures (GOP) or group of frames (GOF) information structure.

Figure 1A:
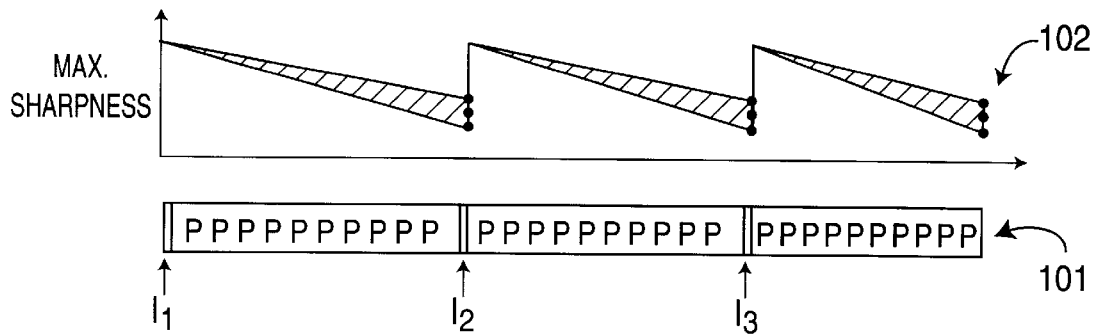
FIGS. 1A through 1C depict graphical representations of relative frame by frame degradation of one or more parameters associated with video fidelity within a group of pictures (GOP)
Figure 1B:
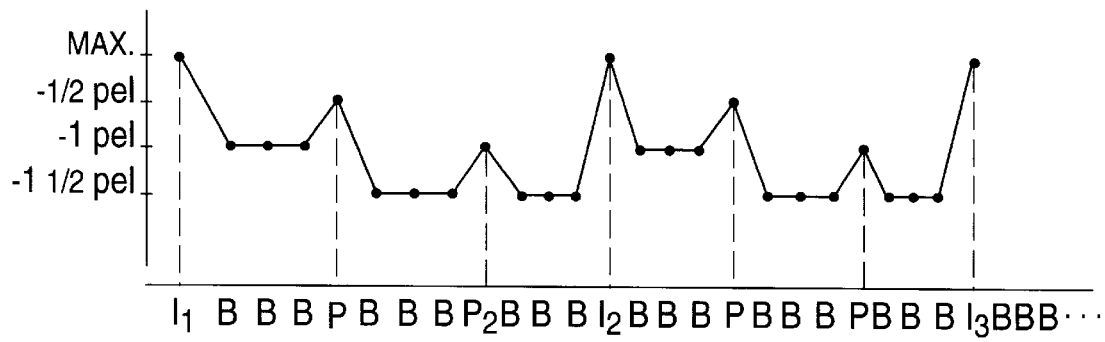
Figure 1C:
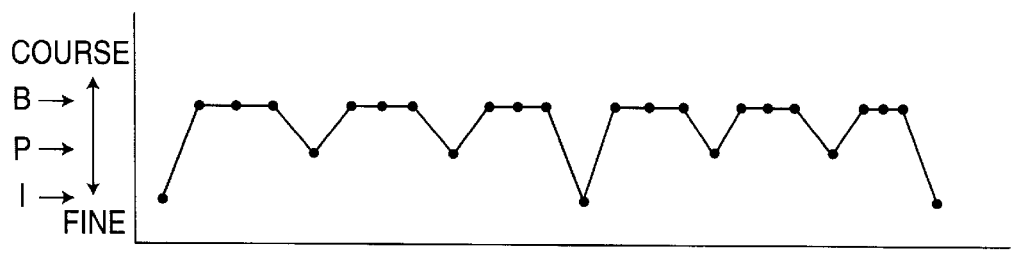

FIGS. 1A through 1C depict graphical representations of relative frame by frame degradation of one or more parameters associated with video fidelity within a group of pictures (GOP). To the extent that such frame by frame degradation within a GOP results in a periodic increase and/or decrease in visual fidelity having a period approximating the GOP period, the aforementioned breathing artifact is produced. If the periodic increase and/or decrease in visual fidelity is sufficiently large, the breathing artifact becomes noticeable to a viewer when the video sequence including the GOP is presented on a display device.

For example, consider the case of a 30 frames per second (fps) presentation/display system responsive to a video information stream comprising MPEG-like video information arranged according to a 15 frame GOP exhibiting significant intra-GOP changes in visual fidelity (e.g., large quantization differences between I- and B-frames). Since the GOP comprises a single I-frame and many B-frames, each half second (15 frame GOP/30 fps) of displayed video begins with a high fidelity I-frame that is followed by a number of relatively low fidelity B-frames (and, typically, P-frames). This displayed sequence of images may exhibit a pulsating (i.e., breathing) characteristic having a period of ½ second due to the inter-frame fidelity variations within the GOP.

The inventors have determined that the primary causes of breathing artifacts are 1) inter-frame differences in quantization levels within a GOP; 2) propagation of half pel motion estimation errors within a GOP; and 3) fidelity anomalies introduced by (or characteristic of) a decoder processing a GOP. Embodiments of the invention addressing all three causes of breathing artifacts will be disclosed.

FIG. 1A depicts a graphical representation of a frame by frame degradation of video "sharpness" within a GOP comprising an I-frame followed by ten P-frames. Sharpness is a function of high frequency response, which is critical to the accurate presentation of edges and other high contrast luminance transitions. Specifically, FIG. 1A depicts a sequence of three GOPs (denoted as 101) and a corresponding diagrammatic representation of a sharpness level of each frame in the GOPs (denoted by reference 102). It can be seen that the sharpness of a video image is at a maximum for each I-frame in the GOPs, with a corresponding decrease in sharpness for each successive P-frame. A breathing artifact is produced due to the gradual degradation and rapid increase in sharpness level at a rate corresponding to the GOP display rate.

In FIG. 1A, the corresponding decrease in sharpness for each successive P-frame is caused by half pel interpolation within the motion compensation circuitry of a decoder processing the GOPs. The half pel interpolator operates to low pass filter the predicted macroblocks or pel groupings. The relatively linear degradation of sharpness level depicted in FIG. 1A is due to the use of P-frames within the GOPs and an assumption that the half pel interpolation error is approximately constant. The shaded portion of the diagrammatic representation comprises a statistical band of errors within each P-frame falls. It must be noted that while each I-frame ($I_1$, $I_2$ and $I_3$) is shown as having the same maximum level of sharpness, the sharpness level of the I-frames is initially determined by an encoder's rate controller based on many factors, including a bit-budget allocated to a GOP. Thus, the level of sharpness and general visual fidelity of an I-frame varies as necessary depending on requirements at the encoder.

FIG. 1B a graphical representation of a frame by frame degradation of video sharpness within a 12 frame GOP comprising an initial I-frame followed by a repeating sequence of three B-frames and one P-frame. Since each P-frame is predicted using the immediately preceding anchor frame (I- or P-frame), a relatively linear degradation in sharpness level for the P-frames is shown. However, since each B-frame is predicted using the anchor frames (I-frame or P-frame) surrounding the B-frame, two half pel interpolations are associated with each B-frame. Therefore, each B-frame is shown as having a sharpness level that is a half pel lower than the least accurate reference frame used to predict the B-frame. It can be seen that the sharpness of a video image is at a maximum for each I-frame in the 15 GOPs, with a varying amount of degradation in sharpness for each successive frame in a GOP. A breathing artifact is produced due to the varying amount of degradation and rapid increase in sharpness level at a rate corresponding to the GOP display rate.

In FIG. 1B the first I-frame ($I_1$) is depicted as having a sharpness level of maximum (max). The first P-frame following that I-frame is depicted as having a sharpness level of one half pel lower than the maximum. The three B-frames predicted using the first I-frame and the first P-frame are depicted as having sharpness levels of one half pel below the sharpness level of the P-frame. Similarly, the second P-frame after the first I-frame has a sharpness level one half pel below the sharpness level of the first P-frame, from which it is predicted. Thus, the B-frames predicted using the first P-frame and the second P-frame have sharpness levels that are one half pel below the second P-frame sharpness level FIG. 1C a graphical representation of a frame by frame quantization level (i.e., granularity) within a 12 frame GOP comprising an initial I-frame followed by a repeating sequence of three B-frames and one P-frame. Since I-frames are typically encoded with a finer quantization level than P-frames, and since P-frames are typically encoded with a finer quantization level than B-frames, FIG. 1C depicts the change in quantization level of video images produced using the GOP structure. It can be seen by inspection that the quantization level starts at a fine level for the initial I-frame ($I_1$) and degrades to a coarser level for the B-frames and to a less coarser level for the P-frames. Thus, a video image produced using the GOP structure depicted in FIG. 1C, including the corresponding quantization granularity levels, will have an increase and decrease in fidelity based upon the frame-type within the GOP structure used to produce an individual video frame. This change or modulation of fidelity also contributes to the aforementioned breathing artifact.

Figure 2:
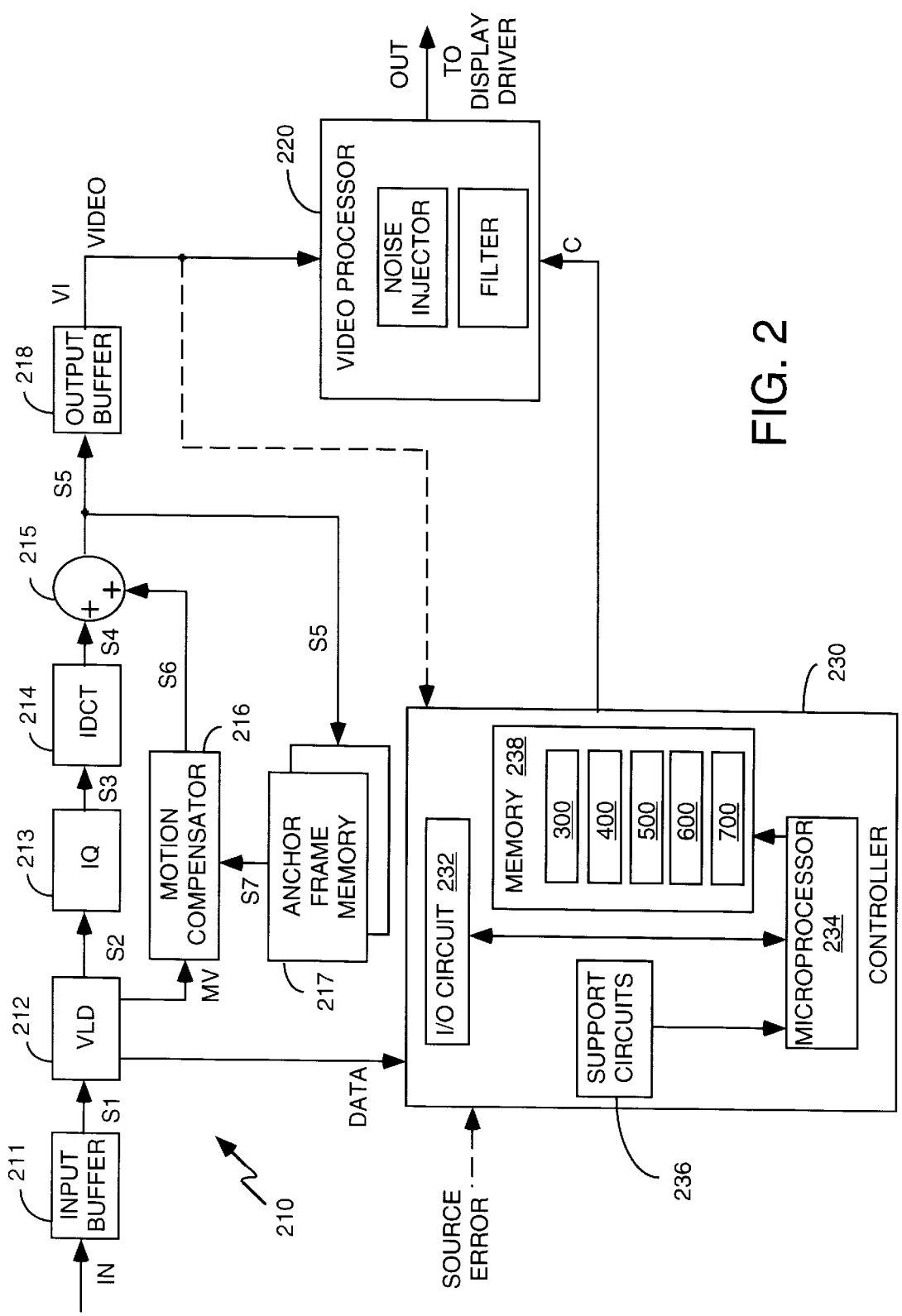
FIG. 2 depicts an embodiment of an MPEG-like decoder according to the invention.

FIG. 2 depicts an embodiment of an MPEG-like decoder 200 according to the invention. Specifically, the decoder 200 of FIG. 2 receives and decodes a compressed video information stream IN to produce a video output stream OUT. The video output stream OUT is suitable for coupling to, e.g., a display driver circuit within a presentation device (not shown). The MPEG-like decoder 200 examines fidelity indicative parameters associated with the information frames (e.g., video or image frames) within the compressed video information stream IN to determine if a resulting decompressed information stream (e.g., a video stream) will likely exhibit the above-described breathing artifact. In response to a determination that a breathing artifact is likely to be present, the MPEG-like decoder 200 modifies a decoded information stream in a manner tending to attenuate the breathing artifact. Advantageously, the invention can operate without any knowledge regarding the behavior of the encoder forming the compressed video stream IN (other than the information within the compressed video stream IN).

The MPEG-like decoder 200 of FIG. 2 comprises a video decoder 210, a video processor 220 and a controller 230. Video decoder 210 operates in a relatively standard manner to receive and decode the compressed video information stream IN to produce a decompressed video stream V1. The decompressed video stream V1 is susceptible to breathing artifact caused by inter-frame fidelity variations within GOPs and anomalies (or characteristics) of the video decoder 210 itself, as described above. The decompressed video stream V1 is coupled to video processor 220 and, optionally, controller 230.

Video processor 220, in response to a degradation control signal C produced by controller 230, adapts a degradation level of one or more frames within the decoded video stream V1 to produce the video output stream OUT, illustratively an baseband digital video stream.

The video processor 220 operates in one of several degradation modes, as will be discussed in more detail below. Briefly, in a noise injection mode of operation, the video processor 220 injects an amount of noise (determined by the controller 230) into a higher fidelity image frame (e.g., an I-frame) calculated to reduce an effective quantization level of the higher fidelity image frame. In this mode of operation, breathing artifacts induced by large differences in inter-frame quantization levels (e.g., per FIG. 1C) are reduced by reducing inter-frame quantization level differences to a threshold difference level. In a filter mode of operation, the video processor selectively applies low pass filtering (LPF) and high pass filtering (HPF) to one or more image frames or image frame types within a GOP. In this mode of operation, breathing artifacts induced by the propagation of prediction errors are reduced by filtering each image frame in a manner tending to equalize the amount of sharpness degradation among all the image frames within a GOP. Other modes of operation will be discussed below.

Controller 230 receives a fidelity indicative parameter signal DATA from video decoder 210 indicative of a, e.g., quantization levels, frame types, GOP positions and other information regarding video frames within the compressed video input stream end. Optionally, the controller 230 receives the decompressed video stream V1. In addition, controller 230 optionally receives a signal SOURCE ERROR indicative of errors imparted to the compressed video information stream IN at the source (i.e., at the encoder).

Controller 230 processes the fidelity indicative parameter signal DATA and, optionally, the decompressed video stream V1 to determine a level of visual fidelity degradation associated with one or more image frames or image frame types within one or more GOPs comprising the compressed video information stream IN.

The controller 230 then determines if the variations in image frame or image frame type degradation levels are such that a breathing artifact is likely to be produced by a subsequent presentation of the decompressed video stream V1. If the identified degradation variations are likely to produce a breathing artifact (e.g., exceed a threshold difference level), then the controller 230 calculates one or more degradation equalization parameters, which are then coupled to the video processor 220 as degradation control signal C. The operation of the controller 230 will be discussed in more detail below with respect to FIG. 3.

In the exemplary embodiment of the MPEG-like decoder 200 of FIG. 2, video decoder 210 comprises an input buffer memory module 211, a variable length decoder (VLD) module 212, an inverse quantizer (IQ) module 213, an inverse discrete cosine transform (IDCT) module 214, a summer 215, a motion compensation module 216, an output buffer module 218 and an anchor frame memory module 217.

The input buffer memory module 211 receives the compressed video stream IN, illustratively a variable length encoded bitstream representing, e.g., a high definition television signal (HDTV) or standard definition television signal (SDTV) output from a transport demultiplexer/decoder circuit (not shown). The input buffer memory module 211 is used to temporarily store the received compressed video stream IN until the 25 variable length decoder module 212 is ready to accept the video data for processing. The VLD 212 has an input coupled to a data output of the input buffer memory module 211 to retrieve, e.g., the stored variable length encoded video data as data stream S1.

The VLD 212 decodes the retrieved data to produce a constant length bit stream S2 comprising quantized prediction error DCT coefficients, and a motion vector stream MV. The IQ module 213 performs an inverse quantization operation upon constant length bit stream S2 to produce a bit stream S3 comprising quantized prediction error coefficients in standard form. The IDCT module 214 performs an inverse discrete cosine transform operation upon bit stream S3 to produce a bitstream S4 comprising pixel-by-pixel prediction errors. These prediction errors (and associated image degradation) are caused by encoder-side quantization of the pixel information, as discussed above with respect to FIG. 1C.

The summer 215 adds the pixel-by-pixel prediction error stream S4 to a motion compensated predicted pixel value stream S6 produced by the motion compensation module 216. The motion compensated predicted pixel value stream S6 will comprise a prediction error component (and associated sharpness degradation) that is related to the number of prior predictions used to produce the present pixel value, as discussed above with respect to FIG. 1A–1B. Thus, the output of summer 215 is, in the exemplary embodiment, a video stream S5 comprising reconstructed pixel values that are degraded by both quantization errors and by cumulative prediction errors, which are discussed above with respect to FIG. 1A–1C.

The video stream S5 (including quantization and prediction errors) produced by summer 215 is coupled to the anchor frame memory module 217 and the output buffer module 218. The anchor frame memory module 217 is accessed by the motion compensation module 216 via signal path S7. The motion compensation module 216 utilizes one or more stored anchor frames (e.g., the I-frame or P-frame last frame of video produced at the output of the summer 215), and the motion vector signal MV received from the VLD 212, to calculate the values for the motion compensated predicted pixel value stream S6.

The video decoder 210 described above also produces a fidelity indicative parameter signal DATA indicative of a, e.g., quantization levels, frame types, GOP positions and other information regarding video frames within the compressed video input stream end. Specifically, these and other fidelity indicative parameters are extracted from the compressed video information stream IN by the VLD 212 in a standard manner. For example, if the compressed video information stream IN comprises an MPEG video stream, the VLD 212 examines the information contained in one or more of the video sequence header, GOP header, picture header, slice header and macroblock header. The extracted information is coupled to the controller 230 as the fidelity indicative parameter signal DATA.

In the exemplary embodiment of the MPEG-like decoder 200 FIG. 2, the controller 230 comprises a microprocessor 234 as well as memory 238 for storing at least one of a degradation equalization routine 300, a quantization equalization routine 400 and a frequency equalization routine 500. The operation of these routines will be discussed in detail below with respect to FIGS. 3–5. The microprocessor 234 cooperates with conventional support circuitry 236 such as power supplies, clock circuits, cache memory and the like as well as circuits that assist in executing the software routines. As such, it is contemplated that some of the process steps discussed herein as software processes may be implemented within hardware, e.g., as circuitry that cooperates with the microprocessor 234 to perform various steps. The controller 230 also contains input/output circuitry 232 that forms an interface between the microprocessor 234, the video decoder 210 and the video processor 220. Although the controller 230 is depicted as a general purpose computer that is programmed to perform specific control functions in accordance with the present invention, the invention can be implemented in hardware as an application specific integrated circuit (ASIC). Moreover, the controller 230 may be functionally combined with one or both of the video processor 220 and the video decoder 210. In fact, it is contemplated by the inventors that a single integrated circuit comprising substantially all the functionality of the MPEG-like decoder 200 of FIG. 2 will be implemented as a single integrated circuit.

Figure 3:
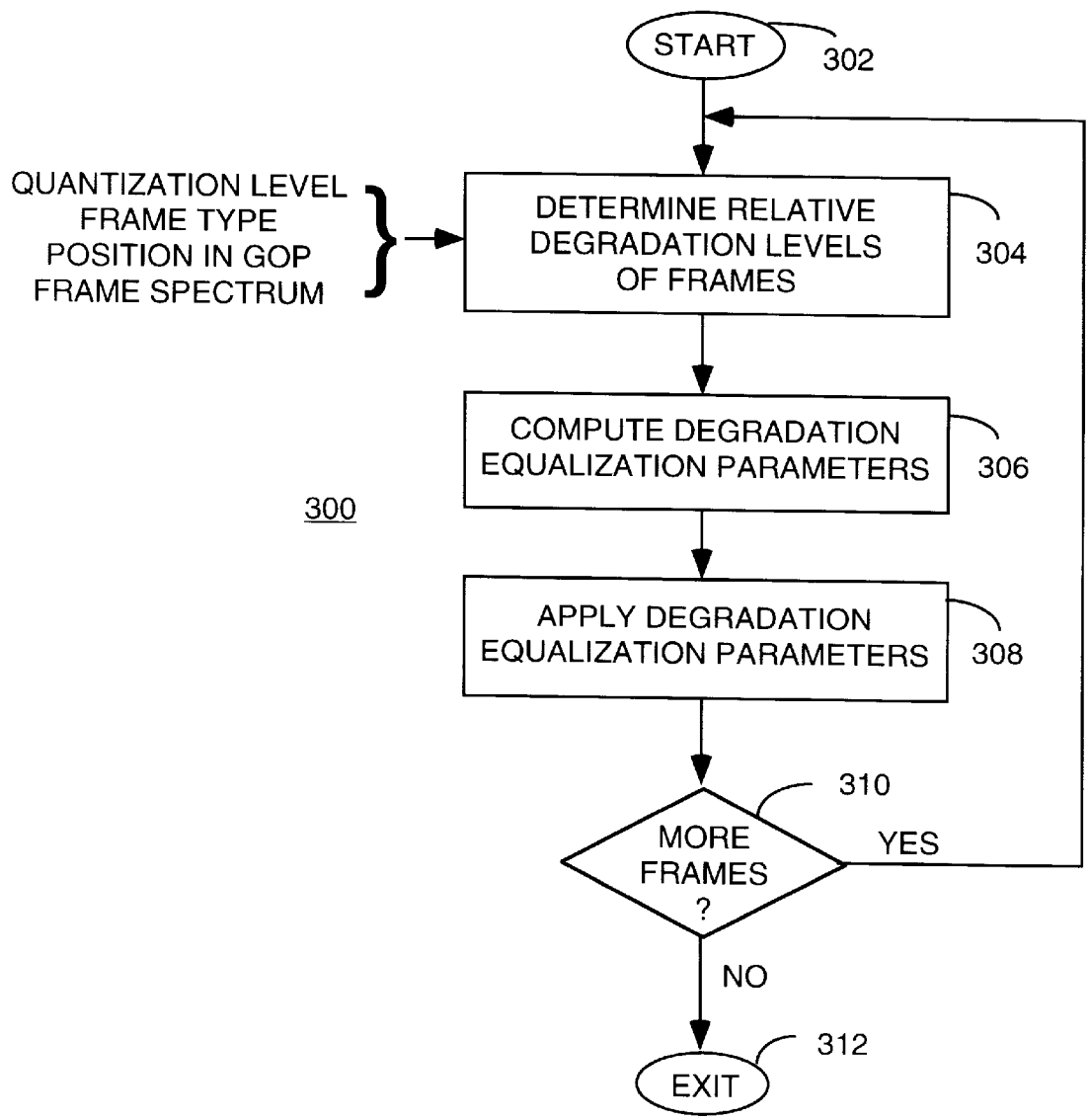
FIG. 3 depicts a degradation equalization routine according to the invention for reducing breathing artifacts in a video signal.

FIG. 3 depicts a degradation equalization routine 300 according to the invention for reducing breathing artifacts in a video signal. The degradation equalization routine 300 may be implemented as a control routine within the controller 230 or, in the case of controller 230 not comprising a general purpose computing device as depicted, as a logical function between cooperating modules of the of the MPEG-like decoder 200 of FIG. 2. The degradation equalization routine 300 is entered at step 302 when, e.g., the video decoder 210 of FIG. 2 begins to receive the compressed video information stream IN. The routine 300 then proceeds to steps 304.

At step 304 the relative degradation levels of received video frames or video frame types are determined. The relative degradation levels are determined by evaluating one or more parameters associated with each video frame or video frame type. Specifically, one or more of various image or video frame parameters such as frame quantization level (e.g., average of frame macroblocks), frame type, frame position within GOP, frame spectrum and the like may be analyzed to determine a degradation level associated a particular frame. The degradation level associated with a particular video or image frame is then compared to, e.g., a nominal or average degradation level associated with the frames comprising a GOP or a sub-set of the frames comprising a GOP. In this manner a degradation variance of a particular frame from a GOP or sub-GOP mean is determined. The routine 300 then proceeds to step 306.

At step 306 the degradation level and/or degradation variance of some or all of the frames evaluated in step 304 is used to compute one or more degradation equalization parameters for one or more frames in the GOP. For example, those frames within the GOP having relatively high fidelity (i.e., relatively low degradation) are degraded in terms of the one or more frame parameters analyzed in step 304 such that the inter-frame variance in fidelity degradation within the GOP is constrained to a level at or below a level resulting in a noticeable breathing artifact. The routine 300 then proceeds to step 308.

At step 308 the degradation equalization parameters computed at step 306 are applied to one or more appropriate frames within the GOP structure such that the inter frame degradation variance within the GOP structure is appropriately constrained. Since degrading the fidelity of a video or image frame is typically easier (in terms of processing complexity and the like), appropriate frames will typically comprise those frames having a relatively high fidelity level. However, in the case of a fidelity parameter that is susceptible to enhancement, appropriate frames may comprise those frames having a relatively low fidelity level. The routine 300 then proceeds to step 310.

At step 310, a query is made as to whether more frames are to be processed. If the query at step 310 is answered affirmatively, then the routine 300 proceeds to step 304. If the query at step 310 is answered negatively, then the routine 300 proceeds to step 312 where it is exited.

It will be noted that one technique used to equalize degradation levels is to further degrade one or more relatively high fidelity video or image frames or frame types. It has been determined by the inventors that the decrease in fidelity of, e.g., an I-frame in a GOP, is much less objectionable to a viewer than the breathing artifact effectively reduced or removed by the operation of the invention. Thus, to the extent that a tradeoff is made in terms of shifting or selectively reducing visual, aural or other information fidelity within one or more frames of a GOP of GOF, the resulting processed information stream (e.g., video output stream OUT) provides a superior presentation to the information consumer.

The invention contemplates the use of one or more methods for determining degradation levels (step 304), computing degradation equalization parameters (step 306) and applying degradation equalization parameters (step 308). Specifically, in one embodiment of the invention, the degradation equalization routine 300 of FIG. 3 is adapted to reduce inter-frame variations in quantization levels within a GOP to substantially a threshold quantization variation level. The quantization equalization embodiment is especially well suited for reducing breathing artifacts related to quantization level variations between different types (i.e., I-frame, P-frame or B-frame) of video or image frames, and will be described below with respect to FIG. 4.

In another embodiment of the invention, the degradation equalization routine 300 of FIG. 3 is adapted to reduce inter-frame variations in frequency domain within a GOP to below a threshold spectrum variation level. The frequency response equalization embodiment is especially well suited for reducing breathing artifacts related to the low pass filtering (i.e., reduction in picture sharpness) imparted to predicted video or image frames (i.e., P-frames or B-frames) due to the propagation of motion estimation errors, and will be described below with respect to FIG. 5.

A first method involves examining a quantization level parameter associated with each encoded video frame. Typically, video decoders such a MPEG video decoders produce a GOP structure having a relatively high fidelity I-frame followed by one or more P-frames and B-frames of diminishing fidelity. It is important to encode the initial I-frame of a GOP structure at a high fidelity level since this frame is used to predict subsequent frames within the GOP structure. Thus, a fine quantization level is typically used by the quantizer in the encoder. Since P-frames are used as anchor frames within a GOP structure (i.e., P-frames are used to predict subsequent P-frames and immediately subsequent and prior B-frames), P-frames are quantized at a level typically finer than the level used for B-frames. As previously noted, variations in quantization level within a GOP contribute to the undesirable breathing artifact. Thus, to equalize the quantization levels within a GOP structure it is necessary to increase the effective quantization level of, e.g., the I-frame and/or one or more of the P-frames within a GOP. An example of quantization degradation equalization will now be described with respect to FIG. 4.

Figure 4:
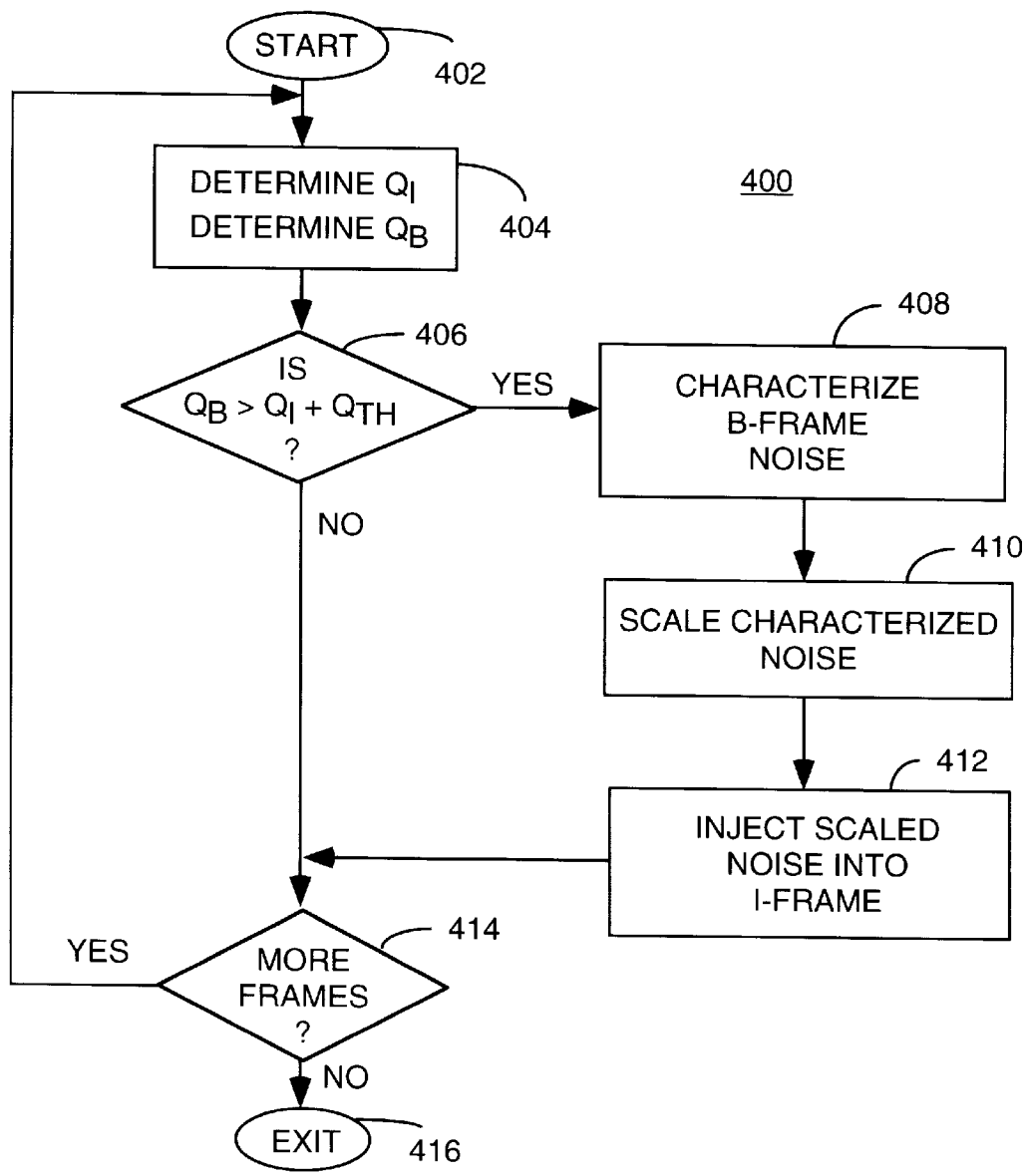
FIG. 4 depicts a degradation equalization routine 400 according to the invention.

FIG. 4 depicts a degradation equalization routine 400 according to the invention. Specifically, the degradation equalization routine 400 of FIG. 4 is directed to reducing breathing artifacts in a video signal related to quantization level variations between an I-frame within a GOP and a plurality of B-frames within the GOP. The routine 400 adapts quantization levels within a GOP structure such that the fidelity of an I-frame within a GOP is reduced to within a threshold fidelity level of, illustratively, the average fidelity level of a plurality of B-frames within the GOP. The degradation equalization routine 400 may be implemented as a control routine within the controller 230 or, in the case of controller 230 not comprising a general purpose computing device as depicted, as a logical function between cooperating modules of the MPEG-like decoder 200 of FIG. 2.

The degradation equalization routine 400 is entered at step 402 when, e.g., the video decoder 210 of FIG. 2 begins to receive the compressed video information stream IN. The routine 400 then proceeds to steps 404.

At step 404, a quantization parameter associated with an I-frame ($Q_I$) is determined by, e.g., averaging the quantization level of each macroblock within the I-frame in the GOP being processed. Additionally, a quantization parameter associated with the B-frames ($Q_B$) is determined by, e.g., averaging the quantization level of each macroblock within one or more B-frames within the GOP being processed. The determination may be made with respect to, e.g., the MPEG variable quantizer_scale, which may be found within the slice layer header of an MPEG compliant video stream and which has an integer value between 1 and 31 (assuming a constant quantizer table such as the default table is used). It must be noted that quantizer_scale is also adjustable at the macro block layer.

The routine 400 then proceeds to step 406, where a query is made as to whether the quantization parameter associated with the B-frame $Q_B$ is greater than the sum of quantization parameter associated with the I-frame $Q_I$ plus a quantization parameter threshold amount $Q_{TH}$. The quantization parameter threshold level $Q_{TH}$ represents a maximal quantization parameter deviation between the B-frame quantization parameter $Q_B$ and the I-frame quantization parameter $Q_I$ that does not result in a noticeable, quantization difference attributable breathing artifact.

If the query at step 406 is answered affirmatively, then the routine 400 proceeds to step 408. If the query at step 406 is answered negatively, then the routine proceeds to step 414, where a query is made as to whether more frames are to be processed. If the query at step 414 is answered affirmatively, then the routine 400 proceeds to step 404. If the query at step 414 is answered negatively, then the routine proceeds to step 416 and exits.

At step 408 the noise within the I-frame and the B-frames is characterized. That is, the amount of noise expected to be found within an I-frame having a quantization parameter $Q_I$ and within a B-frame having a quantization parameter $Q_B$ is determined with respect to a quantization level (i.e., step size) producing a noise distribution.

One method for determining the amount of additional noise expected to be found within a B-frame is by estimating a power density function (pdf) of the quantized AC coefficients of the B-frame DCT coefficients, and then subtracting a similarly obtained pdf for the reference frame (e.g., the anchor frame used by the motion compensation module). In the exemplary embodiment a pdf is kept for each of 63 AC coefficients within the DCT. Since the Laplacian distribution is a good approximation of the actual pdf for an AC coefficient, the exemplary embodiment uses such a Laplacian distribution as the preferred pdf for fitting the data. However, it will be recognized by those skilled in the art that other distribution functions may also be employed in practicing invention. Moreover, any one of several methods may be used to fit the data into the below-described Laplacian pdf.

As illustrated in equation 1, the pdf (i.e., pdf(x)) is estimated by computing the cc that minimizes the difference between the actual probability of each quantization level (computed from the received data) and the probability of that quantization level if the pdf was the estimated pdf.

$$pdf(x) = \frac{\alpha}{2} e^{-\alpha \|x\|} \quad \text{(equation 1)}$$

That is, as illustrated equation 2, minimizing with respect to $\alpha$, where the summation is over all quantization bins B, $p(B_i)$ is the relative frequency of that bin in the received signal, $B_{i_{low}}$ and $B_{i_{high}}$ are the lower and upper limits of the quantization bin (i.e., the lowest and highest values that would be quantized to that value).

$$\sum_i \left( p(B_i) - \int_{B_{i_{LOW}}}^{B_{i_{HIGH}}} pdf_\alpha(x) dx \right)^2 \quad \text{(equation 2)}$$

Assuming the original (unquantized) pdf follows the estimated distribution, the pdf of the error is computed by adding the pdf of the difference between the original and the reconstruction level for each quantization bin, as illustrated in equation 3.

$$error\_pdf_\alpha(x) = \sum_i pdf_\alpha(x - rec(B_i)) \cdot \omega_{B_i}(x) \quad \text{(equation 3)}$$

where $$\omega_{B_i}(x) = \begin{cases} 1 & \text{if } B_{i_{LOW}} < x < B_{i_{HIGH}} \\ 0 & \text{otherwise} \end{cases} ;$$

and where $rec(B_i)$ is the reconstruction level for bin $B_i$.

The error_pdf is then compared to a (similarly obtained) error pdf for the reference frame, and an appropriate amount of noise is added to the low noise frame to reduce the breathing artifact. The added noise would has a similar (or smaller) variance, and may also have the same pdf as the error pdf.

At step 410 the characterized B-frame noise of step 408 is scaled to an appropriate level depending upon the quantization parameter associated with the I-frame $Q_I$. That is, the previously determined pdf is scaled according to the ratio of $Q_B/Q_I$ to produce a scaled pdf The routine 400 then proceeds to step 412, where the scaled characterized noise is injected into the I-frame. In one embodiment of the invention this injection of noise is realized by injecting a random number bounded by the scaled quantization level determined at step 410. In this manner the effective quantization parameter $Q_I$ associated with the I-frame is reduced to a quantization parameter having a value within $Q_{TH}$ of the quantization parameter associated with the B-frames $Q_B$.

It must be noted that the routine 400 of FIG. 4 may be adapted to simultaneously or individually address quantization level variations between I-frames and P-frames and P-frames and B-frames. Moreover, though the routine 400 is depicted as operating on each GOP individually, the inventors contemplate that the routine 400 may be modified to operate on a plurality of GOPs. For example, in the case of a constant bitrate compressed video stream IN, the average bit budget for each GOP formed by an encoder is substantially the same. However, in the case of a variable bitrate information stream, the bit budget for each GOP formed by the encoder may vary as more or less bandwidth becomes available for use by the encoder. In the variable bitrate case, an additional variable is used to ensure that the average quantization parameter of a GOP ($Q_{GOP}$) does not vary from the average quantization parameter of one or more preceding and succeeding GOPs by more than a threshold amount.

Figure 5:
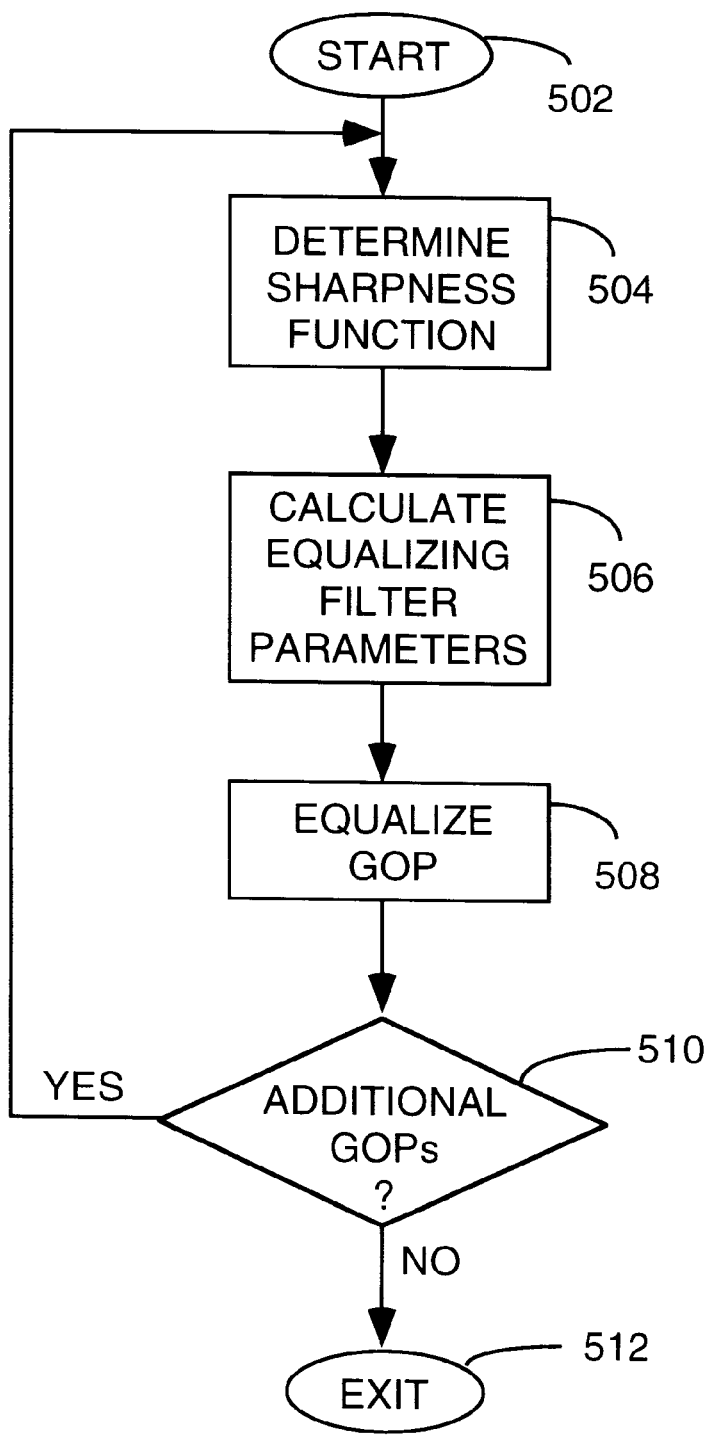
FIG. 5 depicts a flow diagram of a GOP equalization routine according to the invention.

FIG. 5 depicts a flow diagram of a GOP equalization routine 500 according to the invention. Specifically, the GOP equalization routine 500 of FIG. 5 is directed toward reducing breathing artifacts in a video signal caused by successive half pel interpolations of predicted frames within a GOP, as described above with respect to FIG. 1.

The routine 500 is entered at stop 502, when, e.g., the video decoder 210 of FIG. 2 begins to receive the compressed video information stream IN. The routine 500 then proceeds to step 504, where a sharpness function is determined using the GOP structure. That is, an estimation of the propagated degradation in image sharpness is made based upon the types of frames within the GOP and the number of frames within the GOP. For example, a GOP comprising all I-frames will suffer no sharpness degradation due to half pel interpolations (since no predictions are made). Similarly, a GOP comprising a single I-frame followed by a plurality of P-frames and B-frames will suffer some level of sharpness degradation due to half pel interpolations. The sharpness function determined at stop 504 is an estimate of the amount of such sharpness degradation as a function of frame position and/or frame type within the GOP. The routine 500 then proceeds to step 506.

At step 506 equalizing filter parameters are calculated. The equalizing filter parameters comprise low pass and/or high pass filter parameters associated with one or more frames within the GOP. That is, a baseline level of sharpness is selected (e.g., a minimum sharpness level as defined by the most severely sharpness degraded frame, a median sharpness level defined by an average sharpness level of all the frames, or a particular frame type, within the GOP and the like). The equalizing filter parameters are determined for each frame within the GOP based on the position of the frame and/or frame type such that the relative difference in sharpness between frames within the GOP is reduced to below a threshold level, as previously described with respect to FIG. 1. The routine 500 then proceeds to step 508.

At step 508 the calculated equalizing filter parameters are used to equalize, as necessary, one or more of the frames within the GOP. The routine 500 then proceeds to step 510 where a query is made as to whether additional GOPs are to be processed. If the query at step 510 is answered negatively, then the routine 500 proceeds to step 512 and exits. If the query at step 510 is answered affirmatively, then the routine 500 proceeds to step 504, where a sharpness function related to the next GOP is calculated. That is, the routine 500 is repeated for each subsequent GOP. In a case of a fixed GOP structure, the sharpness function determined at step 504 and the equalizing filter parameters calculated at step 506 may be reused for each subsequent GOP.

In one embodiment of the invention "training sequences" are utilized to characterize the errors imparted to a sequence of decoded images by the decoder itself For example, if a distortion within a decoded GOP is introduced by a known factor (e.g., by the motion interpolation filter in the receiver or decoder), a pre-emphasis filter is computed to compensate for the known factor. To identify the distortion, a spectrum analysis function is utilized. That is, the actual spectral characteristic(s) of a training sequence comprising one or more "typical" decoded video frames compared to an "expected" spectral characteristic(s). The spectral characteristics of subsequently decoded video frames are then "corrected" based on filters obtained from the training sequences. It should be noted that the "expected" spectral characteristics may be determined with respect to a second decoder.

The transfer function of the spectral correction filter is determined as the ratio of the expected spectrum and actual spectrum as a function of frequency. This is the desired frequency response of the signal. The filter may be implemented as, e.g., a finite impulse response (FIR) or infinite impulse response (IIR) filter. For example, in one embodiment of the invention, coefficients for an FIR filter substantially satisfying the determined transfer function are calculated, inverted and windowed to a desired number of taps. The resulting FIR filter is used to process each decoded frame such that the spectral characteristics of the decoded frame approach the previously-described "expected" spectral characteristics, thereby equalizing the decoded video output signal.

Figure 6:
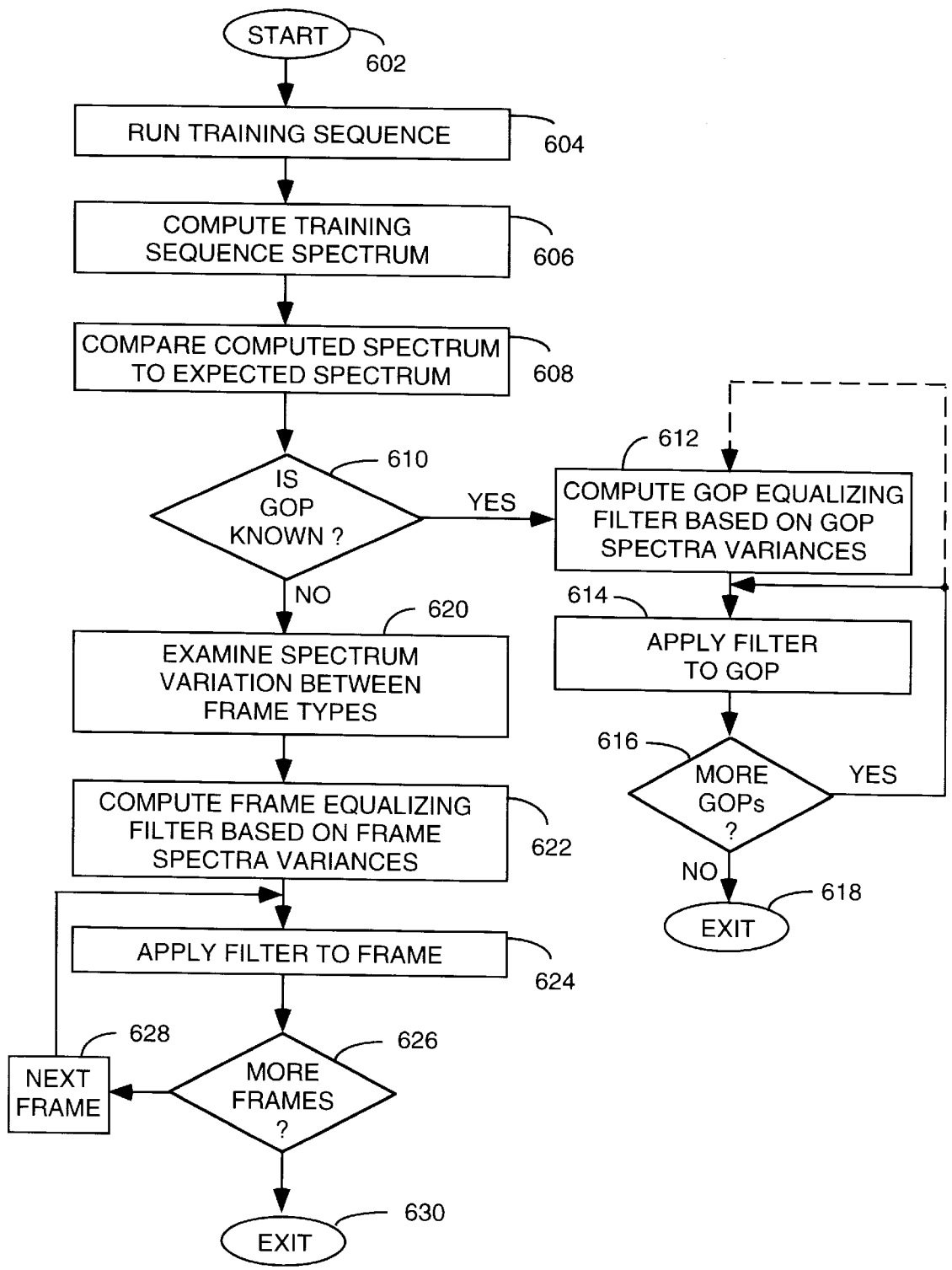
FIG. 6 depicts a flow diagram of a degradation equalization routine according to the invention.

FIG. 6 depicts a flow diagram of a degradation equalization routine 600 according to the invention. Specifically, the degradation equalization routine 600 of FIG. 6 is directed towards reducing artifacts imparted to a sequence of decoded images by, e.g., anomalies within the decoder itself. The routine first characterizes the decoder using a training sequence. The training sequence comprises a "gold code" sequence of encoded images that have been previously been processed using a "known good" decoder to produce an output image sequence having an associated spectral characteristic. This associated spectral characteristic of the known good decoded gold code is denoted as an "expected spectrum."

The routine 600 is entered at step 602, and proceeds to step 604 where a training sequence is run. The running of the training sequence comprises the application to the decoder input (via, e.g., a switch or multiplex unit) of the known "gold code" sequence of encoded images (e.g., an MPEG-like compressed video information stream) such that a decoded training information stream is produced. The routine 600 then proceeds to step 606, where the decoded training information stream is spectrally analyzed to produce a training sequence spectrum. The routine 600 then proceeds to step 608.

At step 608 the training sequence spectrum computed at step 606 is compared to the expected spectrum (i.e., the previously calculated spectrum of the "gold code" video training sequence as produced by a known good decoder). Since, broadly speaking, the differences between the training sequence spectrum and the expected spectrum are primarily caused by differences in decoder behavior, spectral anomalies introduced into the decoded video information stream by the decoder may be isolated from spectral anomalies introduced into the decoded video stream by virtue of half pel interpolation, or other non-decoder error sources. The routine 600 then proceeds to step 610.

At step 610 a query is made as to whether the GOP structure of the video information stream to be decoded is known (i.e., the non-training compressed video sequence). If the query at step 610 is answered affirmatively, then the routine 600 proceeds to step 612 where a GOP equalizing filter is computed based upon the spectral variances between the training sequence GOP and a spectrally analyzed GOP from the compressed video information stream to be decoded. That is, spectral variations between the "gold code" GOP and the received GOP are compared and used to compute an equalizing filter such that the spectral variances between these GOPs are reduced to a level below a threshold level. The routine 600 then proceeds to step 614, where the computed GOP equalizing filter is applied to the received GOP.

The routine 600 then proceeds to step 616, where a query is made as to whether more GOPs are to be processed. If the query at step 616 is answered affirmatively, then the routine proceeds to step 614 where the computer filter is applied to the next GOP. Optionally, the routine may proceed to step 612, where a spectral analysis and comparison function is performed on the next GOP to be processed, resulting in a new GOP equalizing filter calculation. If the query at step 616 is answered negatively, the routine 600 proceeds to step 618 and exits.

If the query at step 610 is answered negatively, then the routine 600 proceeds to step 620, where spectral variations between frame types within the "gold code" training sequence and the received compressed video information stream are made. That is, spectral variations between, e.g., P-frames within the gold code training sequence and P-frames within the received video information stream are compared. Similarly, spectral variations between I-frames and B-frames may also be compared. The routine 600 then proceeds to step 622.

At step 622 one or more frame-type equalizing filters based upon frame spectral variances are computed. That is, spectral variations between, e.g., P-frames of the gold code training sequence and P-frames of the received information stream are used to compute a equalizing filter which, when applied to the P-frames within the received information stream, will reduce the spectral variations to below a threshold level. The filter selection made for a particular is also related to the number of I-frames and P-frames preceding the particular frame within the GOP. For example, since the magnitude of a prediction errors increases as a prediction error is propagated to later frames within a GOP, the filter utilized for later frames within the GOP is selected to impart a correspondingly greater amount of change to the underlying signal. The routine 600 then proceeds to step 624.

At step 624, the frame-type filters computed at step 622 are applied to each appropriate frame within a received GOP. The routine 600 then proceeds to step 626, where a query is made as to whether more frames are to be processed. If the query at step 626 is answered negatively, then the routine proceeds to step 630 and exits. If the query at 626 is answered affirmatively, then the routine then proceeds to step 628, where the next frame is selected for processing, and to step 624, were the selected frame is filtered according to the appropriate frame-type filter computed at step 622. That is, the next frame that is selected (i.e., an I-frame, P-frame or B-frame) is filtered according to an I-frame spectral equalizing filter, a P-frame spectral equalizing filter or a B-frame spectral equalizing filter, as previously computed at step 622.

The above-described embodiments of the invention are directed toward decoder having sufficient memory resources to store an entire GOP for processing. However, where memory constraints prevent the storage and processing of an entire GOP structure, the inventors contemplate several methods for reducing the aforementioned breathing artifact.

In a first method according to the invention and directed to memory 10 constrained decoders, a single frame within the GOP is selected as the "fidelity reference" frame. The other frames within the GOP are degraded or enhanced as necessary to conform to a level of fidelity within a threshold level of the fidelity reference frame. This method will be described in more detail below with respect to FIG. 7.

In a second method according to the invention and directed to memory constrained decoders, the characteristics of a previously decoded GOP are used to adapt a GOP presently being decoded. That is, the characteristics of a first GOP are determined and stored as that first GOP is processed. For example, the GOP structure itself, quantization levels utilized in the GOP and other such fidelity-related parameters are stored. A second GOP, following the first GOP, is processed in a manner utilizing the stored parameters determined with respect to the first GOP. Since these parameters typically do not change much between, e.g., GOPs including images representing a common scene, the assumptions are useful. Moreover, even in the event of a scene change, any fidelity differences between the last GOP of a first scene and the first GOP of a second scene will not be noticeable in view of the actual scene change (i.e., the large visual discontinuity caused by the scene change will tend to mask any breathing artifact due to inaccurate GOP parameter predictions). These methods according to the invention and directed to memory constrained decoders provide an advantage in that there is no need to wait for a full GOP to be received prior to decoding the GOP.

Figure 7:
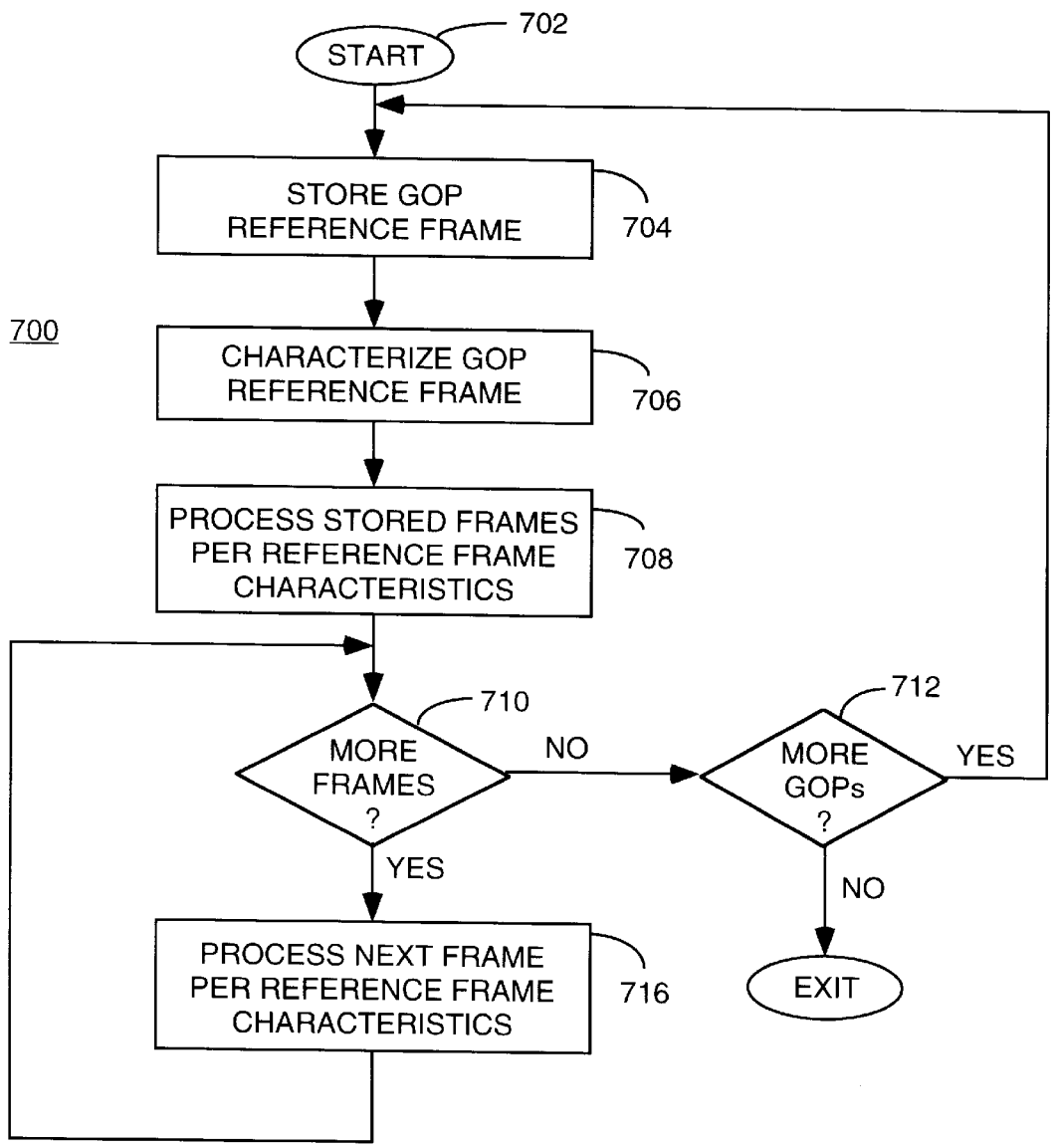
FIG. 7 depicts a flow diagram of a degradation equalization routine according to the invention and suitable for reducing breathing artifacts within the context of a memory-constrained decoder.

FIG. 7 depicts a flow diagram of a degradation equalization routine 700 according to the invention and suitable for reducing breathing artifacts within the context of a memory-constrained decoder. The routine 700 is entered at step 702, when, e.g., the video decoder 210 of FIG. 2 begins to receive the compressed video information stream IN. The routine 700 then proceeds to step 704, where a portion of the GOP is stored in memory. Specifically, a portion of the GOP including at least a predetermined reference frame (e.g., the first anchor frame after an initial I-frame) is stored in memory. Alternatively, only the predetermined reference frame is stored in memory. The routine 700 then proceeds to step 706.

At step 706 the stored reference frame is characterized in the manner previously described by noting, e.g., the quantization step size, position within the GOP, frame type and other parameters. The reference frame characterization results in an approximate baseline level of fidelity that other frames within the GOP will be enhanced and/or degraded to achieve. That is, in the case of an I-frame having significantly greater fidelity than the selected reference frame, the I-frame will be processed in a manner that degrades the fidelity somewhat such that fidelity differences between the I-frame and the selected reference frame are reduced to below a threshold level. Similarly, if the fidelity level of the selected reference frame is significantly higher than, e.g., one or more B-frames within the GOP, the B-frames will be filtered in a manner tending to result in an apparent increase in fidelity. For example, the B-frames may be subjected to high-frequency enhancement to help offset a low pass filtering induced by half pel interpolation within the decoder. The routine 700 then proceeds to step 708.

At step 708 the frames within the GOP are processed according to the characterized parameters of the reference frame. Specifically, in step 708 any frames stored along with the reference frame are selectively enhanced or degraded according to the reference frame characteristics determined at step 706. The routine 700 then proceeds to step 710, where a query is made as to whether more frames exist within the GOP to be processed.

If the query at step 710 is answered affirmatively, then the routine proceeds to step 716, where the next frame within the GOP is processed per the reference frame characteristics determined at step 706. The routine 700 then proceeds to step 710.

If the query at step 710 is answered negatively, then the routine proceeds to step 712, where a query is made as to whether more GOPs are to be processed. If the query at step 712 is answered negatively, than the routine 700 proceeds to step 714 and exits. If the query at step 712 is answered affirmatively, than the routine 700 proceeds to step 704, where the routine 700 is repeated for the next GOP. It must be noted that since GOP to GOP characteristics change relatively slowly (except for, e.g., scene cuts), the next GOP may be optionally processed using the characterized reference frame from the preceding GOP.

In another embodiment of the invention, each GOP is processed according to an average statistical measure of the previous GOP. That is, each GOP is characterized using one or more of the above-described techniques as the GOP is being processed. The results of that characterization are used to process the next GOP. In this manner, the amount of memory required is greatly reduced. Moreover, since the potential inter-GOP fidelity error will be corrected within one GOP, there will be little, if any, breathing artifacts between the last GOP of a scene and the first GOP of a following scene.

In another one embodiment of the invention, error correction and/or equalization is imparted to the decoded video stream on a block by block basis. Advantageously, block level processing provides greatly enhanced control of the equalization process. For example, high pass filtering is appropriately applied to blocks where help-pel interpolation was used, but not to blocks having integer motion vectors. Blocks having integer motion vectors typically do not included the previously discussed half pel error component and, therefore, are not degraded in the previously discussed low pass filtering manner such that an equalizing high pass filtering is warranted. Additionally, block by block processing provides greater control of the equalization process such that, e.g., the controller can ensure that an equalization or correction imparted to a block never exceeds the quantization step, thereby avoiding the introduction of excessive distortion into a resulting image.

Finally, it should be noted that a "copy" of the original reference frame, as decoded by the decoder, may be stored and use as a reference to limit drift to the desired maximal level, such as one quantizer step.

Thus, in one embodiment of the invention, an "enhanced" reference frame (i.e., a reference frame comprising blocks having a maximal level of fidelity) is formed by adding correction information to the "original" or "nominal" reference frame. The enhanced reference frame is then stored along with the original reference frame. Each time a correction is made to avoid the breathing artifact, it is desirable to examine the correction so that the correction itself does not introduce a new artifact. This may be done by limiting the difference between the enhanced reference frame and the original reference frame to less than one quantization step when the DCT of the difference is computed. Thus, in one embodiment of the invention, a DCT of the difference between a block within the enhanced reference frame (i.e., a "corrected" block) and a corresponding block within the original frame is computed. If this difference exceeds a threshold level, illustratively one quantization step, then the original block is used or, optionally, the corrected macroblock is reprocessed. Additionally, this process of controlling the correction imparted to enhanced blocks is used for non-reference frames.

Figure 8:
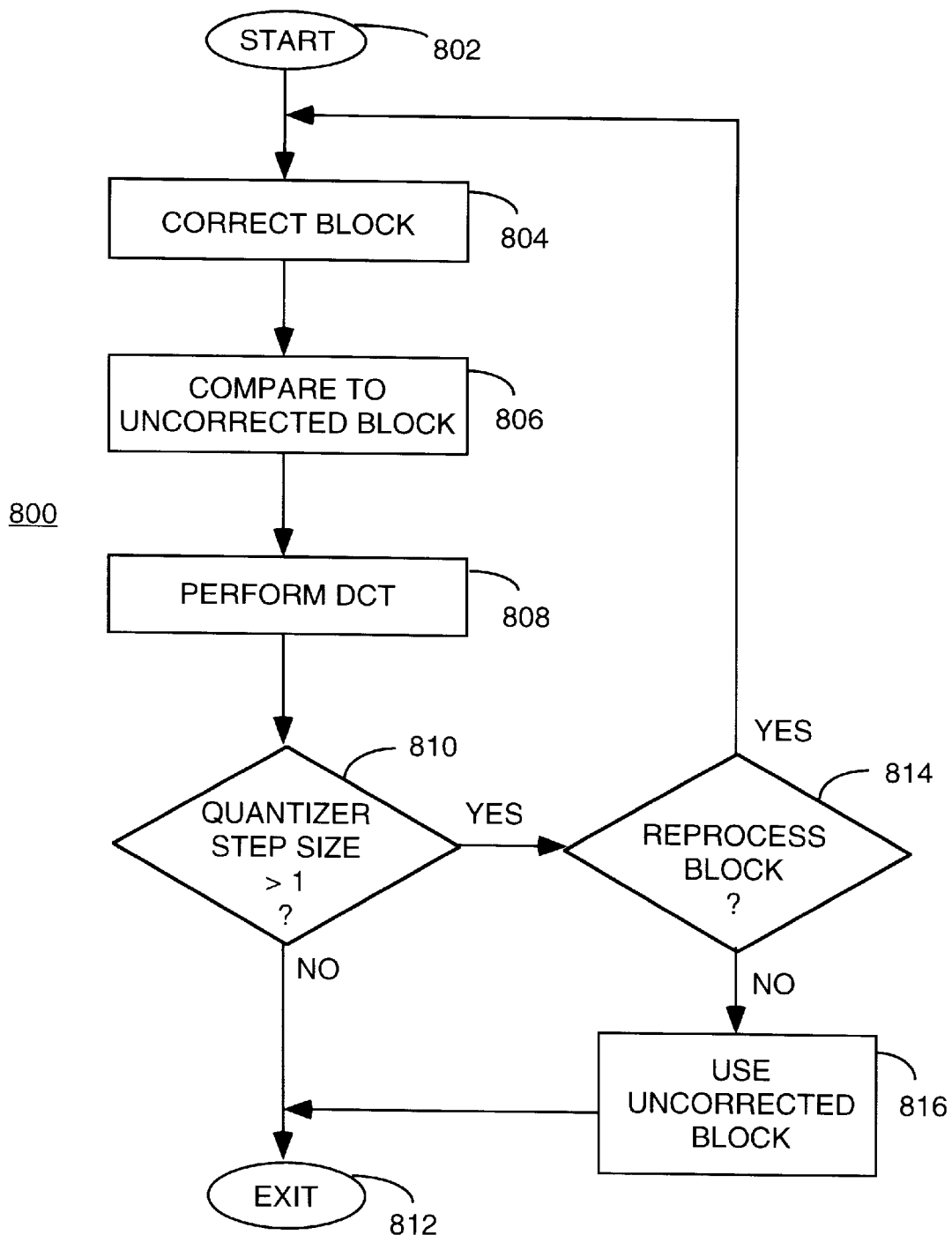
FIG. 8 depicts a flow diagram of a block level correction control routine according to the invention.

FIG. 8 depicts a flow diagram of a block level correction control routine according to the invention. The routine 800 is entered at step 802, and proceeds to step 804, where a block or macroblock is corrected. The routine 800 then proceeds to step 806, where the corrected macroblock or block is compared to a corresponding uncorrected macroblock or, to produce a different quantity. The routine 800 then proceeds to step 808, where a discrete cosine transforms (DCT) is performed on the difference between the corrected and uncorrected macroblock or block. The routine 800 then proceeds to step 810, where a query is made as to whether the quantizer step size of the DCT performed at step 808 is greater than one. If the query at step 810 is answered negatively, then the routine proceeds to 812 and exits. If the query at step 810 is answered affirmatively, then the routine proceeds to step 814, where a query is made as to whether the block or macroblock should be reprocessed.

If the query at step 814 is answered affirmatively, then the routine 800 proceeds to step 804, where the block or macroblock is reprocessed or re-corrected. The reprocessing or re-correction at step 804 utilizes the additional information of the DCT quantizer step size and DCT information formed at step 808.

If the query at step 814 is answered negatively, then the routine 800 proceeds to step 816, where the UN-corrected block or macroblock is used instead of the corrected macroblock. The routine 800 then proceeds to step 812 and exits.

Another block-based embodiment of the invention is similar to that described above with respect to FIG. 3 or FIG. 4, except that the relative degradation levels are determined with respect to individual blocks, and the individual blocks are processed in a manner addressing quantization and/or half pel prediction degradations.

Another block-based embodiment of the invention is similar to that described above with respect to FIG. 7, except that the blocks are processed to conform to, e.g., the average fidelity levels of the blocks in a particular frame type or intra-GOP frame position.

In one embodiment of the invention, the correction filter is computed in an encoder and transmitted to the decoder along with the encoded video stream. The correction filter may comprise an auxiliary stream, an enhancement layer stream or be included within a user data field. The decoder receives and utilizes the correction filter data to filter and enhance the picture in the manner similar to that previously described. However, since in this embodiment the encoder is responsible for computing a correction factor, the correction factor will be much more accurate. It should be noted that in the case of a decoder not utilizing the encoder-provided correction factor, the amount of correction is relatively small (though sufficient to attenuate breathing artifacts) and the non-utilizing decoder will still be able to decode the received compressed video stream.

The present invention can be embodied in the form of computer-implemented processes and apparatuses for practicing those processes. The present invention also can be embodied in the form of computer program code embodied in tangible media, such as floppy diskettes, CD-ROMs, hard drives, or any other computer readable storage medium, wherein, when the computer program code is loaded into and executed by a computer, the computer becomes an apparatus for practicing the invention. The present invention can also be embodied in the form of computer program code, for example whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Although various embodiments which incorporate the teachings of the present invention have been shown and described in detail herein, those skilled in the art can readily devise many other varied embodiments that still incorporate these teachings.

What is claimed is:

1. In a system for processing a sequence of compressed images arranged according to a group of pictures (GOP) information structure, a method for reducing an inter-GOP visual artifact comprising the steps of:

determining, for a first type of information frame within said GOP information structure, a respective level of fidelity degradation;

determining, for a second type of information frame within said GOP information structure, a respective level of fidelity degradation;

computing, using said determined levels of fidelity degradation, a degradation equalization parameter;

processing, using said computed degradation equalization parameter, one of said first and second types of information frames such that said first and second types of information frames have levels of fidelity degradation within a predetermined range.

2. The method of claim 1, wherein said first type of information frame comprises an intra-coded information frame (I-frame), and said second type of information frame comprises a predictive coded information frame (P-frame or B-frame).

3. The method of claim 1, wherein said first type of information frame comprises a forward predicted information frame (I-frame), and said second type of information frame comprises a bi-directionally predicted information frame (B-frame).

4. The method of claim 1, wherein said level of fidelity degradation is determined with respect to a level of quantization.

5. The method of claim 1, wherein said first type of information frame has a higher fidelity level than said second type of information frame, and said step of processing comprises the steps of:

characterizing a quantization noise parameter associated with said second type of information frame;

scaling, according to said degradation equalization parameter, said characterized quantization noise parameter; and injecting, into said first information frame, quantization noise approximating said scaled quantization noise parameter.

6. The method of claim 5, wherein said noise is characterized with respect to a power density function.

7. The method of claim 1, further comprising the steps of:

determining, for a third type of information frame within said GOP information structure, a respective level of fidelity degradation; and processing, using said computed degradation equalization parameter, said third type of information frames such that said first, second and third types of information frames have levels of fidelity degradation within a predetermined range.

8. The method of claim 1, wherein said step of processing comprises the step of filtering, on a block by block basis, those macroblocks having relatively low fidelity and including motion vectors.

9. In a system for decoding a sequence of compressed video information frames arranged according to a group of pictures (GOP) information structure, a method of reducing visual artifacts comprising the steps of:

determining a relative fidelity degradation level of a plurality of said compressed video information frames within a GOP;

computing, using said determined relative fidelity degradation level, a fidelity degradation equalization parameter; and applying, to one or more compressed video information frames within said GOP, said computed fidelity degradation equalization parameter such that said relative fidelity degradation level is reduced to a threshold level.

10. The method of claim 9, wherein said relative fidelity degradation level is determined with respect to a quantization level.

11. The method of claim 9, wherein said relative fidelity degradation level is determined with respect to a compressed video information frame type.

12. The method of claim 9, wherein said relative fidelity degradation level is determined with respect to a relative position of said compressed video information frames within said GOP.

13. The method of claim 9, wherein said relative fidelity degradation level is determined with respect to a spectral information distribution of said compressed video information frames within said GOP.

14. The method of claim 9, wherein said relative fidelity degradation level is determined with respect to a sharpness level of said compressed video information frames within said GOP.

15. The method of claim 13, further comprising the steps of:

comparing said spectral information distribution to an expected spectral distribution;

calculating a spectral distribution equalization parameter; and applying said spectral distribution equalization parameter to said GOP such that said spectral information distribution and said expected spectral distribution are within a threshold level.

16. In a system for processing a sequence of compressed images arranged according to a group of pictures (GOP)

information structure, a method for reducing an inter-GOP visual artifact comprising the steps of:

selecting, for each GOP, one compressed image as a reference image;

determining, for each selected reference image, a level of fidelity degradation;

adapting, according to said determined level of fidelity degradation, image parameters of one or more compressed images such that a fidelity degradation level of said one or more compressed images determining, for a second type of information frame within said GOP information structure, a respective level of fidelity degradation;

computing, using said determined levels of fidelity degradation, a degradation equalization parameter;

processing, using said computed degradation equalization parameter, one of said first and second types of information frames such that said first and second types of information frames have levels of fidelity degradation within a predetermined range.

17. The method of claim 16, wherein said selected reference frame comprises a first P-frame within said GOP.

18. The method of claim 16, wherein each GOP is processed according to a reference frame within a preceding GOP.

19. The method of claim 16, wherein said step of processing comprises the step of filtering, on a block by block basis, those macroblocks having relatively low fidelity and including motion vectors.

20. In a system for decoding a sequence of compressed video information frames arranged according to a group of pictures (GOP) information structure, apparatus comprising:

a video processor, for processing video information frames in response to a control signal; and a controller, for generating said control signal in response to indicia of fidelity of said video information frames;

said controller determining a relative fidelity degradation level of a plurality of said compressed video information frames within a GOP, and computing, using said determined relative fidelity degradation level, a fidelity degradation equalization parameter;

said video processor applying, to one or more video information frames within said GOP, said computed fidelity degradation equalization parameter such that said relative fidelity degradation level is reduced to a threshold level.

21. The apparatus of claim 20, wherein said video processor reduces fidelity levels of relatively high fidelity video information frames by injecting quantization noise into said relatively high fidelity video information frames.

* * * * *

UNITED STATES PATENT AND TRADEMARK OFFICE
CERTIFICATE OF CORRECTION

PATENT NO : 6,125,147

DATED : September 26, 2000

INVENTOR(S) : Dinei Afonso Ferreira Florencio; Shipeng Li

It is certified that error appears in the above-identified patent and that said Letters Patent are hereby corrected as shown below:

Title page, item [73], Assignee: before "Motorola, Inc., Schaumburg, Ill.," add: --Sarnoff Corporation, Princeton, New Jersey; and--

Signed and Sealed this

Twenty-ninth Day of May, 2001

Attest:

NICHOLAS P. GODICI

*Attesting Officer*     *Acting Director of the United States Patent and Trademark Office*